(12) United States Patent
Sumaria et al.

(10) Patent No.: US 11,874,111 B2
(45) Date of Patent: Jan. 16, 2024

(54) DYNAMIC DISPLAY OF MARKERS ON AN ELECTRONIC MAP

(71) Applicant: Kayak Software Corporation, Stamford, CT (US)

(72) Inventors: Mihin Sumaria, Boston, MA (US); Nicholas McMahon, Peabody, MA (US); Jason Brillon, Boston, MA (US); Liliana Wu de Freitas Rosa, Chelsea, MA (US)

(73) Assignee: Kayak Software Corporation, Stamford, CT (US)

( * ) Notice: Subject to any disclaimer, the term of this patent is extended or adjusted under 35 U.S.C. 154(b) by 0 days.

(21) Appl. No.: 17/470,595

(22) Filed: Sep. 9, 2021

(65) Prior Publication Data

US 2023/0070544 A1 Mar. 9, 2023

(51) Int. Cl.
*G01C 21/00* (2006.01)
*G01C 21/36* (2006.01)
*G01C 21/32* (2006.01)

(52) U.S. Cl.
CPC .......... *G01C 21/3811* (2020.08); *G01C 21/32* (2013.01); *G01C 21/367* (2013.01); *G01C 21/3644* (2013.01)

(58) Field of Classification Search
None
See application file for complete search history.

(56) References Cited

U.S. PATENT DOCUMENTS

| | | | | |
|---|---|---|---|---|
| 8,880,535 B1* | 11/2014 | Agarwal | ............... | G06F 16/583 |
| | | | | 707/748 |
| 2004/0243307 A1* | 12/2004 | Geelen | ............... | G01C 21/3635 |
| | | | | 342/357.31 |
| 2008/0172244 A1* | 7/2008 | Coupal | .................. | G06Q 10/02 |
| | | | | 705/5 |
| 2011/0264370 A1* | 10/2011 | Jakobson | ........... | G01C 21/3682 |
| | | | | 345/441 |
| 2013/0311910 A1* | 11/2013 | Stambaugh | ......... | G06F 16/9537 |
| | | | | 715/760 |

(Continued)

FOREIGN PATENT DOCUMENTS

| | | | | | |
|---|---|---|---|---|---|
| KR | 20140055663 A | * | 5/2014 | | |
| WO | WO-2016124986 A1 | * | 8/2016 | ............. | G01C 21/32 |
| WO | WO-2016156937 A1 | * | 10/2016 | ......... | G01C 21/3682 |

OTHER PUBLICATIONS

Machine translation of KR-20140055663-A (Year: 2014).*

(Continued)

*Primary Examiner* — Anne Marie Antonucci
*Assistant Examiner* — Kyle S Park
(74) *Attorney, Agent, or Firm* — Lee & Hayes P.C.

(57) ABSTRACT

Techniques for improving the display of markers on a map include pre-computing cells for multiple locations on the map and associating points of interest with the pre-computed cells. In response to a request from a user device to display points of interest for a particular location, stored data specifying the pre-computed cells for the particular location is accessed and, for each of the cells, a point of interest is selected from the points of interests associated with that cell. The user device is caused to display the map with a marker in each of the cells for the selected point of interest.

20 Claims, 8 Drawing Sheets

(56) References Cited

U.S. PATENT DOCUMENTS

2014/0298255 A1* 10/2014 Huffman ............... G06F 3/0484
                                                        715/805
2019/0311196 A1* 10/2019 Chandrashekar .. G01C 21/3679
2020/0209013 A1*  7/2020 Kornev .............. G01C 21/3682

OTHER PUBLICATIONS

JeremyD [online], "Google Map API Zoom Range." Stackoverflow.com forum response, dated Sep. 4, 2015, retrieved on Oct. 27, 2022, retrieved from URL <https://stackoverflow.com/questions/9356724/google-map-api-zoom-range/32407072#32407072, 4 pages.

Krjampani [online], "How to find out Geometric Median," Stackoverflow.com forum response, dated Oct. 17, 2012, retrieved on Oct. 27, 2022, retrieved from URL <https://stackoverflow.com/questions/12934213/how-to-find-out-geometric-median/12936831#12936831, 9 pages.

Mapbox [online], "Zoom Level," Glossary definition, retrieved on Oct. 27, 2022, retrieved from URL <https://docs.mapbox.com/help/glossary/zoom-level/, 7 pages.

* cited by examiner

DYNAMIC DISPLAY OF MARKERS ON AN ELECTRONIC MAP

TECHNICAL FIELD

This description generally relates to techniques for dynamically displaying markers for points of interest on an electronic map.

BACKGROUND

An electronic map is a useful tool for displaying a geographical area to a user, along with markers indicating points of interest in the geographical area. For example, FIG. 1 shows an electronic map 100 of part of the Greater Boston area in Massachusetts. In this example, the map 100 includes multiple markers 102 identifying lodgings in the displayed area, as well as a price (e.g., a nightly rate) associated with each lodging. Through display of this information, the map 100 can assist a user with making travel decisions while keeping cost in mind.

However, the markers 102 shown in the map 100 are extremely congested, making it difficult for the user to identify the different available lodgings and their locations. The markers 102 also overlap to the point where the prices of lodgings are no longer visible. While a user may be able to interact with the map 100 to, for example, zoom-in on a particular marker 102, such interaction may cause the placement of the markers 102 to be recalculated, which increases the consumption of computing resources and can cause one or more of the markers 102 to disappear from view.

SUMMARY

In general, in an aspect, a computer-implemented method includes receiving a request from a user device to display points of interest for a location on a map. In response to the request, stored data specifying cells for the location on the map is accessed, with one or more of the cells having been associated with at least one point of interest. For each of the one or more cells, a point of interest is selected from the at least one point of interest associated with that cell. The user device is caused to display the map with a marker in each of the one or more cells for the selected point of interest.

In general, in an aspect, a system includes at least one processor and at least one computer-readable storage device storing instructions executable by the at least one processor to perform operations including receiving a request from a user device to display points of interest for a location on a map, and in response to the request: accessing stored data specifying cells for the location on the map, with one or more of the cells having been associated with at least one point of interest; for each of the one or more cells, selecting a point of interest from the at least one point of interest associated with that cell; and causing the user device to display the map with a marker in each of the one or more cells for the selected point of interest.

In general, in an aspect, at least one non-transitory computer-readable storage medium stores instructions executable by at least one processor to perform operations including receiving a request from a user device to display points of interest for a location on a map, and in response to the request: accessing stored data specifying cells for the location on the map, with one or more of the cells having been associated with at least one point of interest; for each of the one or more cells, selecting a point of interest from the at least one point of interest associated with that cell; and causing the user device to display the map with a marker in each of the one or more cells for the selected point of interest.

Implementations of the above aspects can include one or more of the following features.

In an aspect, the operations can include generating the cells for the location on the map, and associating points of interest with the cells. The cells can be generated and the points can be associated with the cells before the request is received from the user device. The cells can be generated for each of multiple zoom levels of the map, and the operations can include accessing the stored data specifying the cells for the location for a particular zoom level associated with the request. In some examples, a size of each cell is determined based on a zoom level of the map and a size of the marker.

In an aspect, the marker in each of the one or more cells is a primary marker, and the operations include, for each of the one or more cells, selecting at least one other point of interest associated with that cell, and causing the user device to display the map with at least one secondary marker in each of the one or more cells for the at least one other point of interest. In some examples, the operations include causing the user device to display the at least one secondary marker in response to a zoom level of the map satisfying a threshold value.

In an aspect, the operations can include causing the user device to display the marker at the geometric median of each of the one or more cells. In some examples, the operations include causing the user device to display the marker at the geometric median of each of the one or more cells in response to a zoom level of the map satisfying a threshold value. In some examples, the operations include causing the user device to display the marker with cached static information associated with the selected point of interest, receiving live information associated with the selected point of interest, and causing the user device to display the marker with the live information In an aspect, the request includes one or more search criteria, and selecting the point of interest associated with each of the one or more cells includes applying the search criteria. In some examples, the selected point of interest includes a lodging, a restaurant, a rental agency, or combinations of them, among others.

Implementations of the above aspects provide one or more of the following advantages.

By pre-computing cells for different locations on a map and assigning points of interest to the pre-computed cells, the technology described here enables more precise display of map markers and reduces overlap among adjacent markers. In this manner, the technology improves the display of markers on an electronic map, as well as the experience of a user of the electronic map. The technology also performs pre-computation for multiple levels of zoom of a map, thereby facilitating a consistent map display as a user changes the zoom or otherwise interacts with the map.

Pre-computation also reduces the amount of computing resources required to display map markers relative to, for example, techniques that compute marker placement for each viewport selected by each user. In addition, pre-computation enables markers to be displayed at a user device more quickly by reducing the processing time associated with, for example, identifying points of interest for display and selecting marker display locations.

These and other aspects, features, and implementations can be expressed as methods, apparatus, systems, components, program products, methods of doing business, means or steps for performing a function, and in other ways, and will become apparent from the following descriptions, including the claims.

DESCRIPTION OF DRAWINGS

Like reference symbols in the various drawings indicate like elements.

DETAILED DESCRIPTION

The technology described here pre-computes map information to facilitate dynamic display of markers on an electronic map. Specifically, the technology pre-computes cells for different map locations at multiple zoom levels of the electronic map. After pre-computing the cells, the technology assigns points of interest, such as lodgings, rental agencies, or restaurants, among others, to some or all of the cells. In some examples, coordinates for display of a primary marker within each cell, such as the geometric median of the cell, are also determined. Using the pre-computed information, the technology causes display of a map with a primary marker and, optionally, one or more secondary markers in respective cells for selected points of interest.

Figure 2:
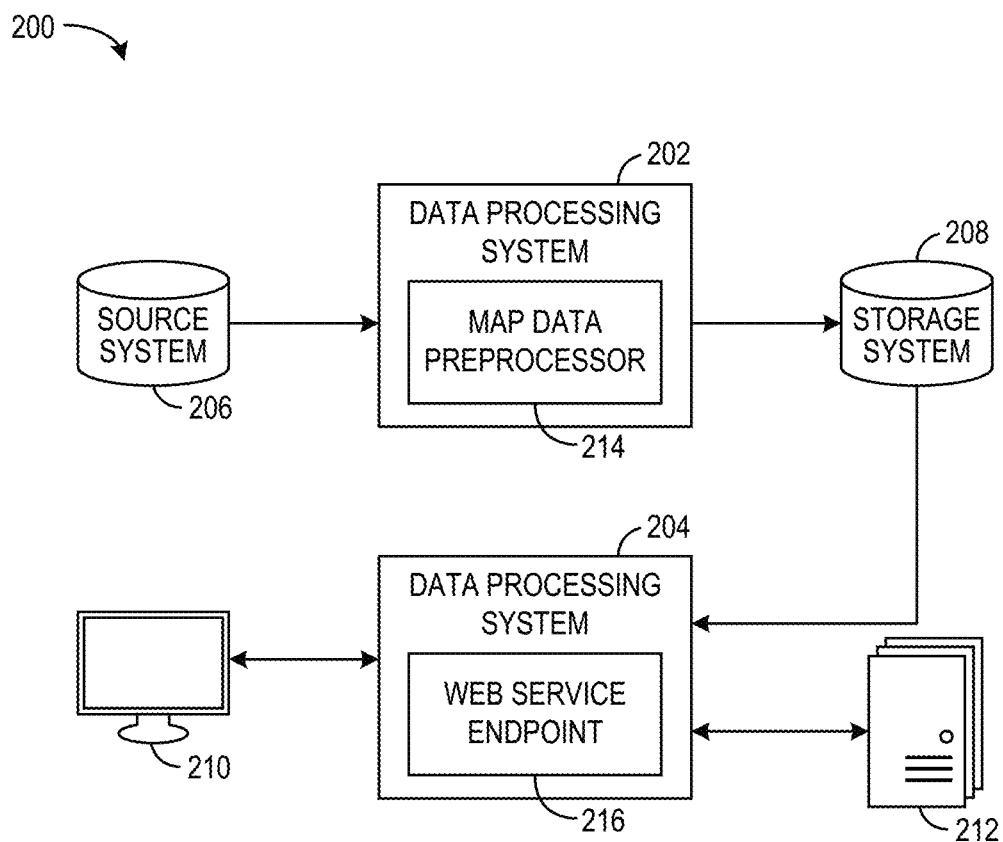
FIG. 2 illustrates an example system for dynamic display of markers on an electronic map.

Referring to FIG. 2, an example system 200 for dynamic display of markers on an electronic map is shown. In this example, the system 200 includes data processing systems 202, 204, storage systems 206, 208, a user device 210, and one or more servers 212. In general, each of the data processing systems 202, 204 can include one or more computers, servers, cloud computing resources, or combinations of them, among other computing systems. Each of the storage systems 206, 208 can include one or more databases, data warehouses, or combinations of them, among other computer-readable storage mediums, and the user device 210 can include a mobile device or other computing device. Although the system 200 illustrates a particular example for implementing the technology described here, other implementations having additional or fewer components, or which combine the operations of, for example, the data processing systems 202, 204 (or distribute them across additional data processing systems) are also within the scope of the present disclosure.

As shown in FIG. 2, the data processing system 202 implements a map data preprocessor 214 configured to pre-compute various items of data in order to facilitate display of markers on an electronic map. In operation, the map data preprocessor 214 receives map data from the storage system 206. The map data can include spatial information that describes locations and other geographic features with respect to a coordinate system (e.g., longitude and latitude). In some examples, the map data also includes non-spatial attributes of the spatial data, such as a type of the location or a zoom level associated with the spatial data.

The map data preprocessor 214 processes the map data to pre-compute cells for different locations at multiple zoom levels of an electronic map. In general, a location can include any region or place on the map, such as a city, a state, or a landmark, among others. In some examples, the map data preprocessor 214 pre-computes cells for all locations on the map. To reduce the computational burden of computing and storing cells, the map data preprocessor 214 can pre-compute cells for a particular set of locations, such as travel destinations or locations having a requisite number of points of interest (e.g., lodgings), among other factors. The set of locations for which cells are to be pre-computed can be provided to the map data preprocessor 214 in advance and can be updated from time to time.

Figure 3A:
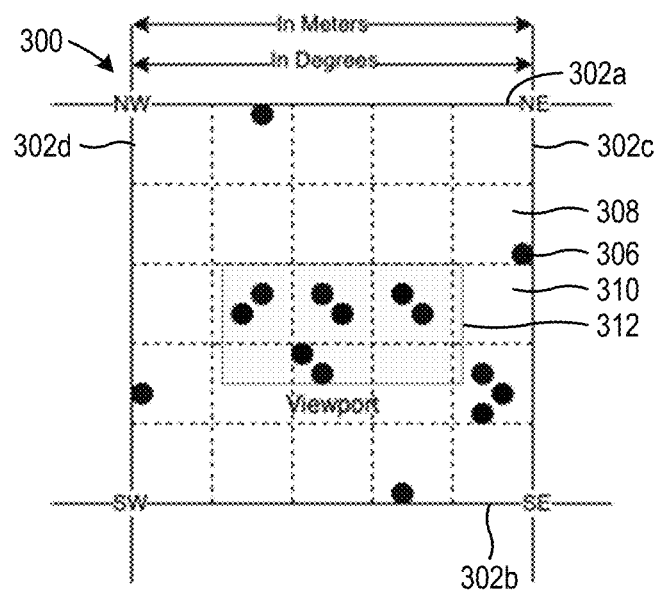
FIGS. 3A and 3B illustrate example cells for an electronic map.

To pre-compute cells for a particular location, the map data preprocessor 214 can first identify the bounds of the location on the map. For example, referring to FIG. 3A, the map data preprocessor 214 identifies the northernmost latitude (nlat) 302a, the southernmost latitude (slat) 302b, the easternmost longitude (elon) 302c, and the westernmost longitude (wlon) 302d for the location 300 to identify the bounds of the location.

After identifying the bounds of the location, the map data preprocessor 214 calculates the difference in longitude for the location in degrees using the equation $dlon_{degrees}$=abs(elon−wlon). The map data preprocessor 214 then converts the difference in longitude from degrees to meters using the equation $dlon_{meters}$=haversine((nlat, wlon), (nlat, elon)), where haversine calculates the haversine or great-circle distance between two coordinates.

The map data preprocessor 214 determines the max width for a primary marker in each cell. In some examples, the max primary marker width is determined based on an expected contents of the marker. For example, if the primary marker is to display a price associated with a particular point of interest (e.g., a nightly rate at a lodging), then the max primary marker width can be determined based at least in part on an expected maximum price (e.g., from historical data) and the currency. In some examples, the map data preprocessor 214 first determines the max primary marker width in pixels (marker_width_pixels), and then converts the max primary marker width from pixels to meters. For example, the number of meters per pixel for a given zoom level and range of latitudes of the map can be determined using the equation mid_lat=(nlat+slat)/2. Then, the max primary marker width in meters can be determined using the equation marker_width_meters=meters_per_pixel*marker_width_pixels.

Figure 3B:
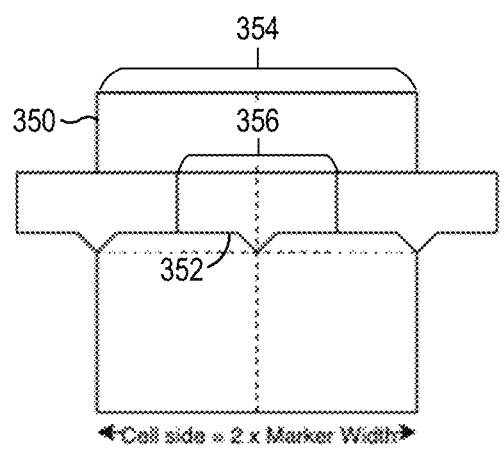

Next, the map data preprocessor 214 calculates a size for each cell based in part on the determined primary marker width. For example, referring to FIG. 3B, the map data preprocessor 214 can select a size for a cell 350 such that a primary marker 352 fits entirely within the cell 350, thereby minimizing overlap among primary markers in adjacent cells when displayed on a map. In this example, the cell 350 is square, with a length of each side 354 of the cell being two times the width 356 of the primary marker 352. In other examples, the length of each side 354 of the cell can be another length, such as equal to the width 356 of the primary marker 352. In this manner, the space available on the map for primary markers can be maximized while preventing overlap among markers in adjacent cells (e.g., when the primary marker is displayed at the center or geometric median of the cell). In some examples, the length of each side 354 of the cell 350 can be calculated (in degrees) using the equation cell_size=$dlon_{degrees}$*marker_width_meters/$dlon_{meters}$.

Using the computed cell size, the map data preprocessor 214 can generate a grid of cells for the location. For example, the map data preprocessor 214 can divide the difference in the longitudinal bounds of the location by the longitudinal length of the cell to determine a number of cells along the longitudinal axis (x-axis) of the location. Similarly, the map data preprocessor 214 can divide the difference in the latitudinal bounds of the location by the latitudinal length of the cell to determine a number of cells along the latitudinal axis (y-axis) of the location. Using this information, the map data preprocessor 214 can generate the grid of cells for the location. In some examples, the map data processor 214 generates a key for the grid of cells using the following equations:

$$x_{grid} = \text{floor}(\text{latitude/cell\_size})$$

$$y_{grid} = \text{floor}(\text{longitude/cell\_size})$$

$$\text{grid\_key} = <x_{grid}>\_<y_{grid}>$$

After generating a grid of cells for the location, the map data preprocessor 214 can assign points of interest to some or all of the cells. The term point of interest is used broadly to refer to any physical location that a user may find useful or interesting, such as a lodging, a rental agency, an airport, a restaurant, or a landmark, among others. In general, the points of interest can be included in or discovered from the map data, or otherwise provided to the map data preprocessor (e.g., from the storage system 206). Once obtained, the map data preprocessor 214 can assign each of the points of interest to one of the cells based on, for example, the physical location of the point of interest falling within the bounds of the cell. For example, referring to FIG. 3A, a point of interest 306 can be associated with a cell 308 due to its location within the cell 308. On the other hand, a cell 310 is not associated with any points of interest since no points of interest are located within the cell 310. In some examples, the points of interest are assigned to a particular cell by reference to the grid key value for the cell. By pre-computing cells and assigning points of interest to the pre-computed cells, the technology described here is able to account for points of interest that may not be visible in a viewport 312 (e.g., a region of a map displayed on the user device 210) when providing markers for display.

The map data preprocessor 214 can also pre-compute coordinates for display of a primary marker in each cell. For instance, in some examples, the map data preprocessor 214 determines a geometric median of the point(s) of interest assigned to each cell for use in displaying the primary marker. In general, the geometric median of the point(s) of interest is the point which is closest to the rest of the points. Thus, to determine the geometric median, the map data preprocessor 214 can identify the point of interest that minimizes the sum of squares of the Euclidean distances to all other points. In some examples, the map data preprocessor 214 can project the points onto the x-axis to calculate the sum of squares of horizontal distances to other points, and project the points onto the y-axis to calculate the sum of squares of vertical distances to other points. The map data preprocessor 214 can then identify the point that minimizes the sum of squares of the horizontal and vertical distances to determine the geometric median of the cell in O(n log n) time. Once determined, the coordinates of the geometric median can be used for display of a marker within the cell. In this manner, the primary marker can be displayed at a position that more accurately represents the location of a given point relative to, for example, displaying the marker at the center of the cell or at the average location of the points.

In some examples, the pre-computed coordinates for display of the primary marker is based in part on a zoom level of the map. For example, when the map is below a threshold level of zoom (e.g., fully zoomed out or nearly fully zoomed out), the geometric median of each cell can be calculated and used as the display coordinates for the primary marker to avoid overlap with markers in adjacent cells. On the other hand, another location, such as the location of a point of interest selected for display, the center of the cell, or the average location of the points assigned to the cell, among others, can be used when the map is above a threshold level of zoom (e.g., fully zoomed in or nearly-fully zoomed in). In this manner, the map data preprocessor 214 can forgo the computational complexity of computing the geometric median when there is a relatively low risk of overlap among markers in adjacent cells.

The processes described above for pre-computing cells for different locations, associating points of interest with the pre-computed cells for each location, and determining the display coordinates (e.g., the geometric median) for the primary marker in each cell can be carried out for multiple zoom levels of a map. In general, map data providers, such as Google and Mapbox, offer multiple levels of zoom for electronic map displays. For example, Google provides map displays with zoom levels ranging between 0 and 20. Similarly, Mapbox provides map displays with zoom levels ranging between 0 and 22. Other map data providers offer map displays with other levels of zoom. Thus, the map data preprocessor 214 can pre-compute cells for each location at each level of zoom offered by the particular map data provider to ensure that points of interest are appropriately grouped and marker coordinates are accurately determined for a particular view selected by a user, among other things. In some examples, each cell is broken into smaller cells when zooming in to ensure display of markers from previous zoom level(s).

After generating the pre-computed data using the map data, the map data preprocessor 214 stores the pre-computed data in the storage system 208. In some examples, the storage system 208 includes a database (e.g., a relational database), and the pre-computed data is stored as entries (e.g., database records) in the database, with one entry per cell, location, and zoom level or another format that can be efficiently accessed and processed by, for example, a web service endpoint 216. In some examples, the pre-computed information includes some or all of the following information: an identifier (e.g., placeid) representing the location for which the data was pre-computed, the zoom level for which the data was pre-computed, an identifier (e.g., cell_key) of a pre-computed cell for the location and zoom level, an array of points of interest associated with the pre-computed cell, and coordinates (e.g., longitude and latitude) of a pre-computed location (e.g., the geometric median) for display of a primary marker within the cell.

Referring back to FIG. 2, the data processing system 204 implements a web service endpoint 216 configured to use the pre-computed data to display marker(s) for point(s) of interest on an electronic map at the user device 210. Initially, the web service endpoint 216 receives a request from the user device 210 to display marker(s) for point(s) of interest associated with a particular location of the map. In some examples, the request includes an identifier for the particular location of the map. Alternatively, or in addition, the request includes (or the web service endpoint otherwise obtains) coordinates of the location, coordinates defining a viewport of the map to be displayed on the user device 210, or combinations of them, among others. In some examples, the request includes an indication of a zoom level of the map to be (or being) displayed on the user device 210.

After receiving the request, the web service endpoint 216 generates a response configured to cause display of marker(s) for point(s) of interest on a map at the user device 210. To generate the response, the web service endpoint 216 accesses, from the storage system 208, the pre-computed data for the location at the specified zoom level (or at a default zoom level if no zoom level is specified). The web service endpoint 216 then selects a point of interest to identify via the primary marker in each of the pre-computed cells for the location. For example, the web service endpoint 216 can apply one or more rules and/or filters to the point(s) of interest assigned to each pre-computed cell to select the point of interest for display via the primary marker. In some examples, the primary marker can include information associated with the selected point of interest, such as a price, a rating, or combinations of them, among other information.

In some examples, the web service endpoint also selects one or more other points of interest to identify via one or more additional markers. These additional marker(s), sometimes referred to as secondary marker(s), allow the technology to convey a level of density for points of interest while avoiding the computational complexity and congestion (e.g., overlapping) associated with computing and displaying multiple primary markers in a cell. In general, the web service endpoint 216 can apply one or more rules and/or filters to the point(s) of interest assigned to each pre-computed cell to select the point(s) of interest for display via the secondary marker(s). In some examples, the number of secondary markers selected for display in a cell can depend on the number of points of interest assigned to the cell relative to a threshold value, the number of points of interest assigned to the cell relative to the number assigned to other cells in the viewport, the zoom level of the map, or combinations of them, among other factors. The secondary marker(s) can be smaller or otherwise less pronounced than the primary marker, and can include different information than the information included in the primary marker, or no information at all (other than indicating the location of the point of interest). The information included with the primary marker (and, in some cases, the secondary marker(s)) for each cell can be obtained from the storage system 208, received in response to a query to the servers 212 (e.g., travel agency servers), or both.

In some examples, the selection and display of the secondary markers can depend in part on the zoom level of the map. For example, if the map is fully zoomed out or nearly fully zoomed out (e.g., zoom levels 0 to 6 for Mapbox), then secondary markers may not be displayed due to the relatively small area for placing these markers. Similarly, if the map is fully zoomed in or nearly fully zoomed in (e.g., zoom levels above 15 for Mapbox), then secondary markers may not be needed since there is enough display area to show all points of interest as primary markers and therefore may not be displayed. At other zoom levels, up to a threshold number (e.g., four) secondary markers can be displayed. Since the primary marker of the cell may be displayed at the geometric median of the cell for at least some of these zoom levels (e.g., zoom levels 7 to 10 in Mapbox), the placement of the secondary markers can account for placement of the primary marker. For example, if a point of interest for which a secondary marker is to be displayed is located at the geometric median, then the secondary marker may not be displayed to avoid overlap with the primary marker.

Once the primary marker and, optionally, the secondary marker(s) are selected for each pre-computed cell, the web service endpoint 216 formulates the response to the user device 210. In some examples, the response is a JavaScript Object Notation (JSON) response that includes coordinates for the marker(s) to be displayed, information to be included with the displayed marker(s), coordinates of the center of the map to be displayed, a zoom level of the map to be displayed, or combinations of them, among others. In some examples, the information included in the response is spread over multiple transmissions to the user device 210. For example, an initial response transmitted to the user device 210 can include static data, such as the marker locations, map coordinates, zoom level, cached or estimated information (e.g., cached or estimated price information) to be included with the displayed marker(s), or combinations of them, among other information. In this example, one or more subsequent responses transmitted to the user device 210 can include dynamic data, such as live or real-time information (e.g., live or real-time price information) that is retrieved from the servers 212 for display with the marker(s). In this way, the static data can be provided to and displayed at the user device 210 in a seemingly instantaneous manner, with dynamic data (e.g., live or real-time prices, ratings, etc.) to follow as it is received from the servers 212. Additional requests and responses can be transmitted between the user device 210 and the web service endpoint 216 to update the map and markers displayed at the user device 210 as a user changes the zoom level, changes the viewport, or otherwise interacts with the map.

Figure 4:
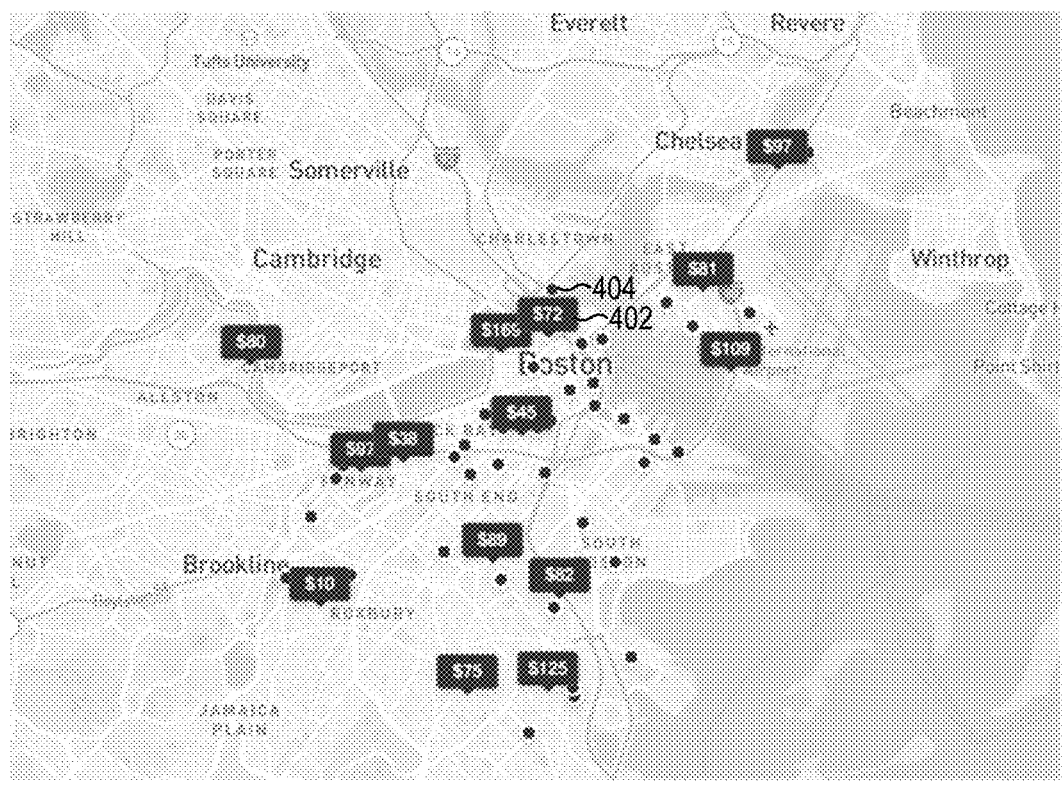
FIG. 4 illustrates an electronic map.

FIG. 4 illustrates an example of an electronic map 400 including markers generated and displayed in accordance with the technology described here. In this example, a user of the user device 210 has requested display of lodgings (e.g., hotels, motels, hostels, inns, private homes, etc.) in Boston, Massachusetts. In response, the web service endpoint 216 accesses the pre-computed data to identify the pre-computed cells associated with Boston, Massachusetts, as well as the lodgings assigned to each of the cells. For each of the pre-computed cells, the web service endpoint 216 selects lodgings for display via a primary marker 402 and one or more secondary markers 404. For example, the web service endpoint 216 can select the cheapest price lodging, the highest rated lodging, a sponsored lodging, or another lodging for display via the primary marker 402 in each cell. The web service endpoint 216 can also select the next cheapest or highest rated lodgings up to a threshold level of lodgings for display via the one or more secondary markers 404 in each cell (e.g., if four secondary markers are to be displayed per cell, the web service 216 can select the second, third, fourth, and fifth cheapest or highest rated lodgings for display via the secondary markers). To make these selections, the web service endpoint can obtain cached or estimated price or rating information (e.g., from the storage system 208) and/or live pricing information (e.g., from the servers 212) for the lodgings. In some examples, the web service endpoint 216 applies one or more rules and/or filters to the lodgings assigned to each cell based on criteria received from a user to select the lodgings for display via the primary marker 402 and/or the secondary marker(s) 404 in each cell.

Figure 1:
FIG. 1 illustrates an electronic map.

After selecting the lodgings for display, the web service endpoint 216 generates a response to the user device 210 to cause the user device 210 to display the map 400 with the primary marker 402 and the one or more secondary markers 404 at predetermined coordinates in each cell. The primary marker 402 in each cell also includes the price (e.g., nightly rate) for the selected lodging. By generating and displaying map markers in this way, the technology enhances the map view interface by reducing overlap among primary markers relative to, for example, the map 100 shown in FIG. 1, while still conveying density through the secondary markers. In addition, by pre-computing various information as described herein, the map 400 and its markers can be presented to a user more quickly than a map displayed without such pre-computations, such as the map 100 shown in FIG. 1.

Figure 5A:
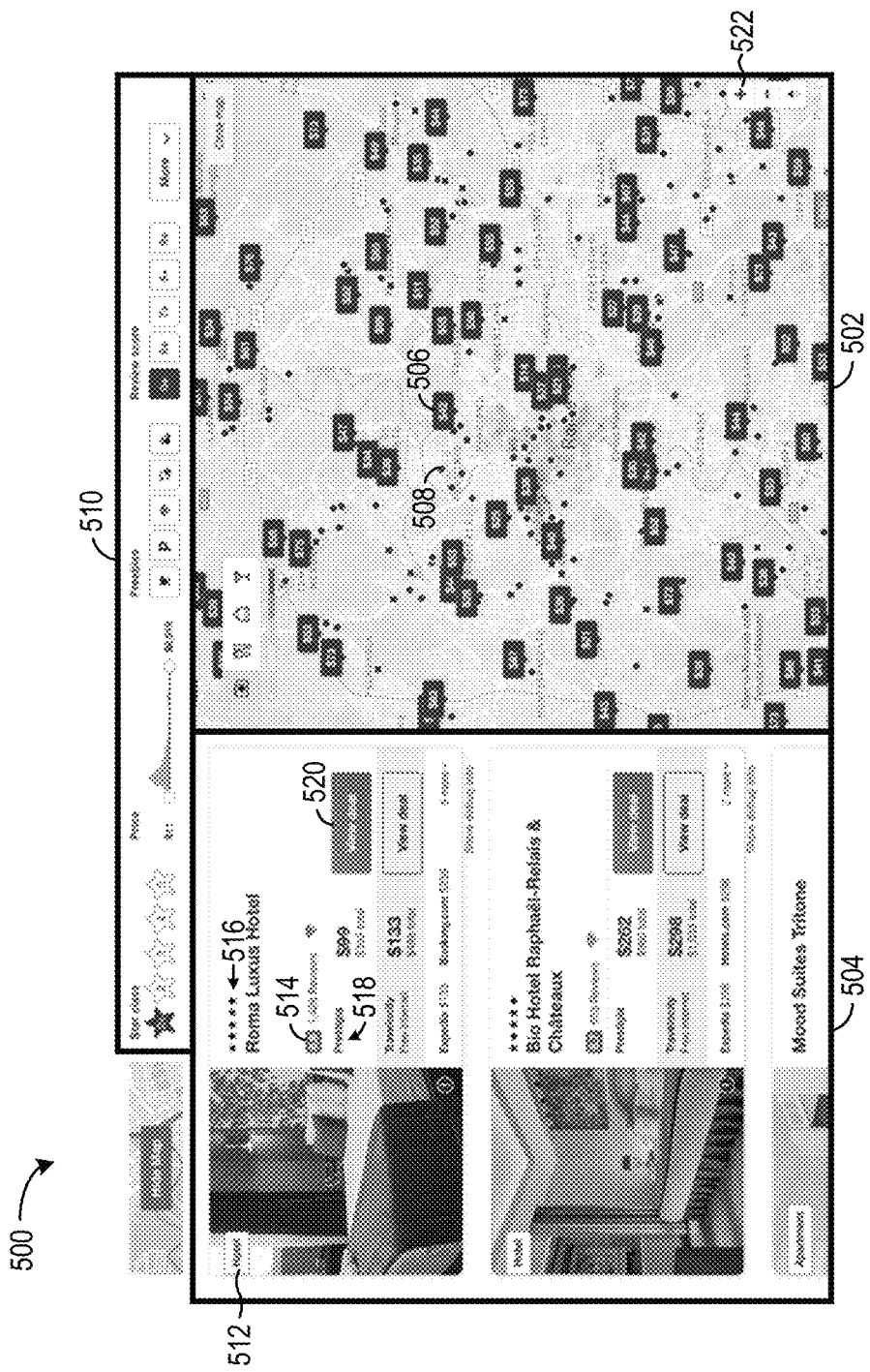
FIGS. 5A and 5B illustrate example user interfaces with electronic maps.
Figure 5B:
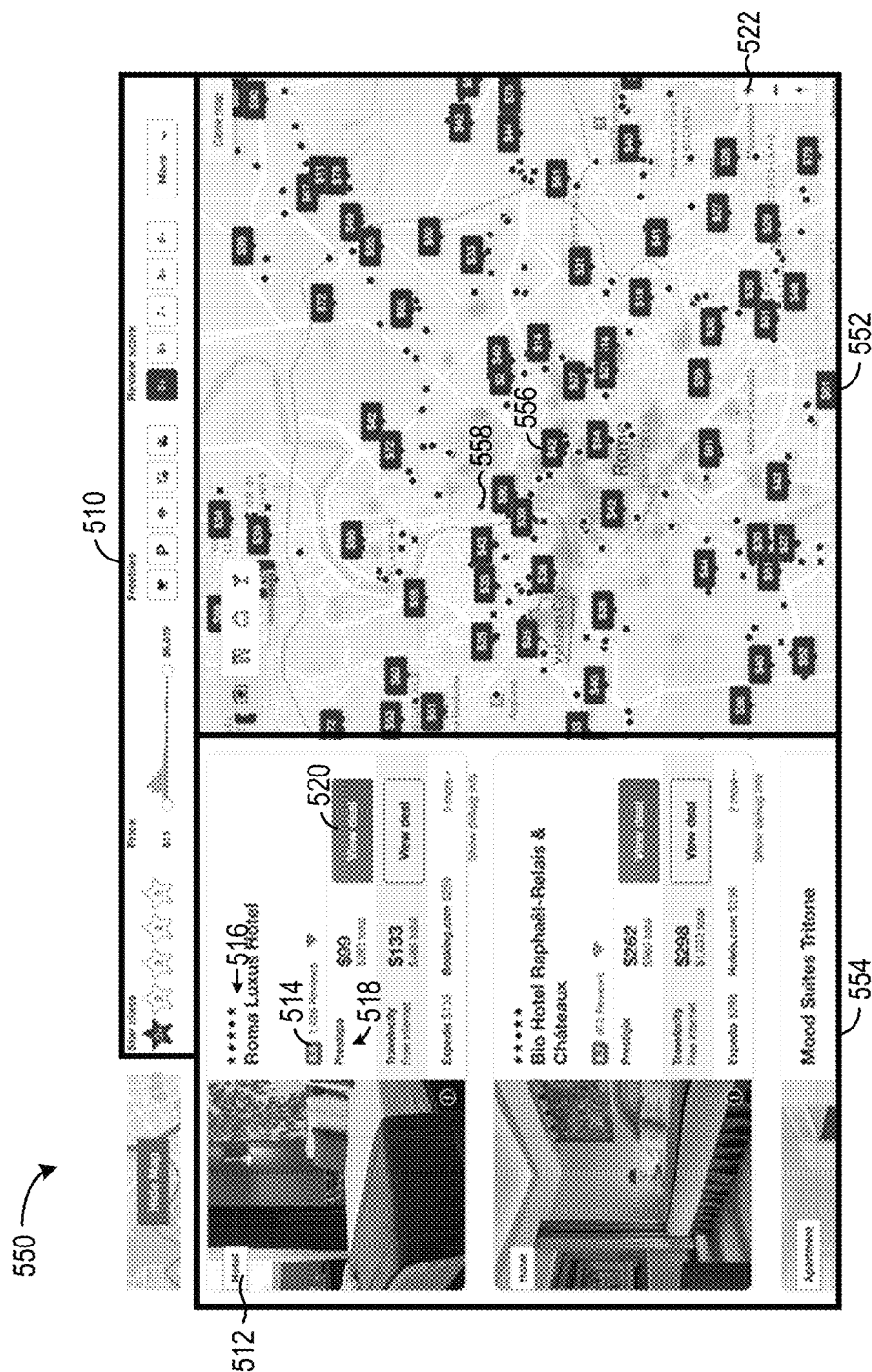

FIGS. 5A and 5B illustrate example user interfaces including electronic maps generated in accordance with the techniques described herein. Referring to FIG. 5A, a user interface 500 containing a map portion 502 and a list portion 504 is shown. In this example, the map portion 502 includes a primary marker 506 and one or more secondary markers 508 identifying lodgings in each pre-computed cell associated with Rome, Italy. Each of the primary markers 506 and secondary markers 508 are selected and displayed in accordance with the techniques described herein, and further based on search criteria 510 specified by a user via the user interface 500. The list portion 504 includes additional details for the lodgings associated with the primary markers 506 and/or the secondary markers 508, such as a lodging type 512, a lodging rating 514, a lodging star class 516, among other information. The listing portion 504 also identifies one or more providers 518 from which a particular lodging is available, as well as a "view deal" option 520 to complete booking of the lodging. The information included in the list portion 504 can be obtained from the storage system 508, the servers 212, or both.

FIG. 5B illustrates a user interface 550 containing a map portion 552 and a list portion 554. In this example, the map portion 552 is a zoomed-in version of the map portion 502 shown in FIG. 5A. For example, because the secondary markers 508 in the map portion 502 conveyed a high density of points of interest in the central Rome area, a user may have interacted with a zoom-in button 522 to reveal the zoomed-in map portion 552 and explore the points of interest in this area. As shown in FIG. 5B, zooming in has caused the technology to display primary markers 556 and secondary markers 558 within pre-computed cells for the increased zoom level. In this example, the lodgings identified by the primary markers 506 in the map portion 502 are also identified by the primary markers 556 in the map portion 552 (at least where visible in the map portion 552). The primary markers from the previous zoom levels are still displayed as the user zooms in to avoid confusion regarding the identified point of interest. The list portion 554 also includes similar information as the list portion 504. In this manner, the technology enhances the map view interface and user experience by maintaining consistency across zoom levels and preventing markers from disappearing or moving in response to increases in zoom level.

Figure 6:
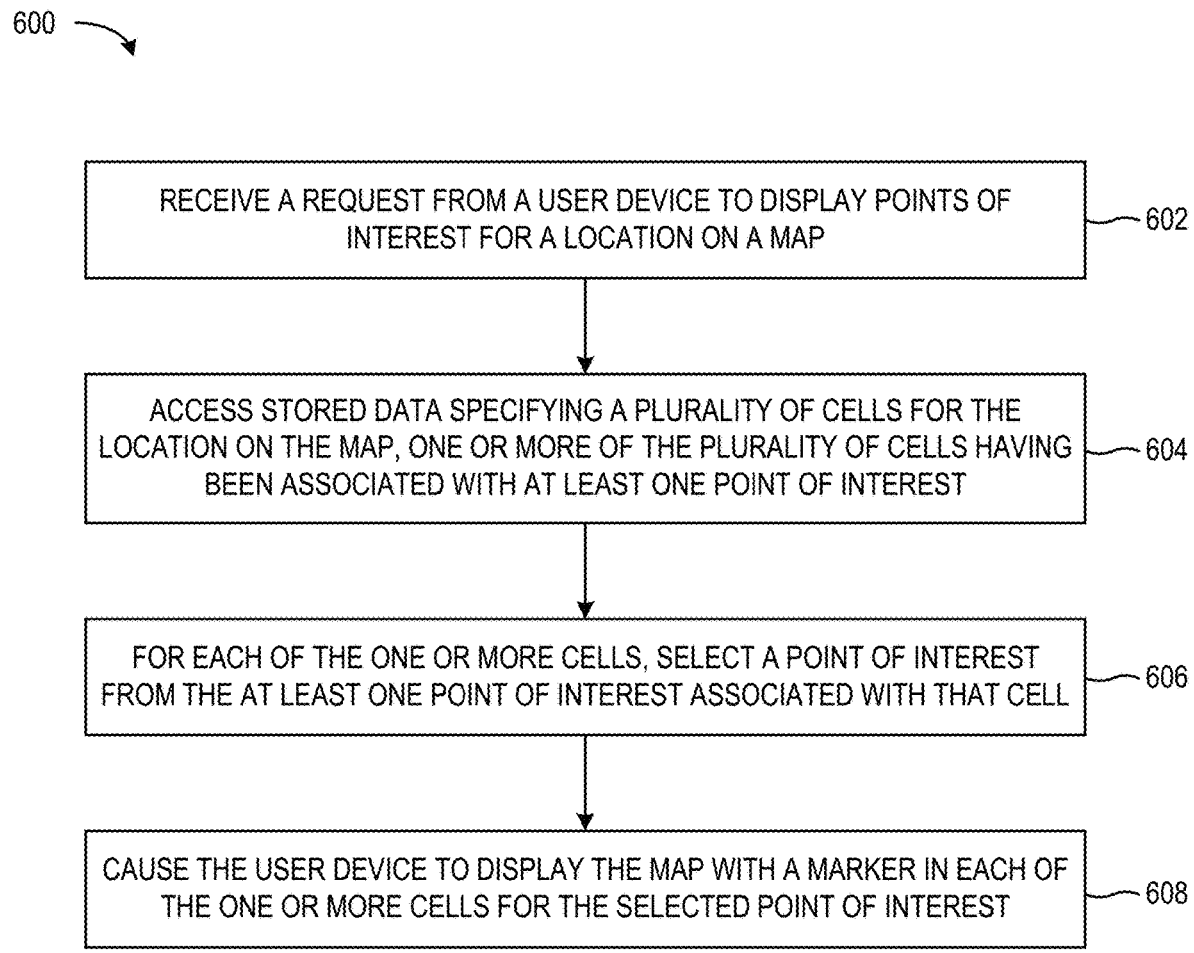
FIG. 6 illustrates an example process for dynamic display of markers on an electronic map.

FIG. 6 illustrates an example process 600 for dynamic display of markers on an electronic map. In some examples, the electronic device(s), system(s), or component(s), or portions or implementations thereof of the system 200 shown in FIG. 2 are configured to perform the process 600, such as the data processing system 202 and/or the data processing system 204, among others.

Operations of the process 600 include receiving 602 a request from a user device to display points of interest for a location on a map. For example, the request can be received from the user device (e.g., the user device 210) by a web service endpoint, such as the web service endpoint 216 of the data processing system 204.

In response to the request, stored data specifying a plurality of cells for the location on the map is accessed 604. The stored data also specifies at least one point of interest that has been associated with one or more of the plurality of cells. For example, a preprocessor, such as the map data preprocessor 214, can pre-compute cells for different locations at multiple zoom levels of the map, as described herein. The preprocessor can also associate points of interest, such as a lodgings, rentals agencies, or restaurants, among others, with some or all of the pre-computed cells. The preprocessor can store data indicative of the pre-computed cells, the associated points of interest, and other pre-computed information (e.g., the display coordinates for a primary marker of a cell) in a storage system (e.g., the storage system 208) in a format that is efficiently accessible by, for example, the web service endpoint 216. In some examples, the pre-computed data, including the plurality of cells and the association of the plurality of points of interest with the plurality of cells, is generated before the request is received from the user device.

For each of the one or more cells, a point of interest from the at least one point of interest associated with that cell is selected 606 for display via a primary marker on the map. In some examples, one or more other points of interest associated with a respective cell are selected for display via one or more secondary markers on the map. One or more rules and/or filters can be applied to the points of interest assigned to each pre-computed cell to select the point(s) of interest for display via the primary and/or secondary marker(s). In some examples, the request includes one or more search criteria (e.g., a threshold price that points of interest should satisfy, a threshold rating that points of interest should satisfy, etc.), and selecting the point of interest includes applying the search criteria. In some examples, selection and display of markers is based on a zoom level of the map.

The user device is caused to display 608 the map with a primary marker in each of the one or more cells for the selected point of interest. In some examples, the user device is also caused to display one or more secondary markers on the map for the one or more other selected points of interest. In some examples, the user device is caused to display the primary marker at the geometric median of the respective cell, which can be pre-computed (e.g., by the map data preprocessor 214) based on the points of interest assigned to the cell. In some examples, the user device is initially caused to display the marker with static information associated with the selected point of interest (e.g., cached or estimated price information). The web service endpoint 214 (or another component) can query one or more third party servers (e.g., the servers 212) or other data repositories to retrieve live information associated with the point of interest (e.g., real-time or near real-time price information). The user device can then be caused to display the marker with the live information associated with the selected point of interest.

Figure 7:
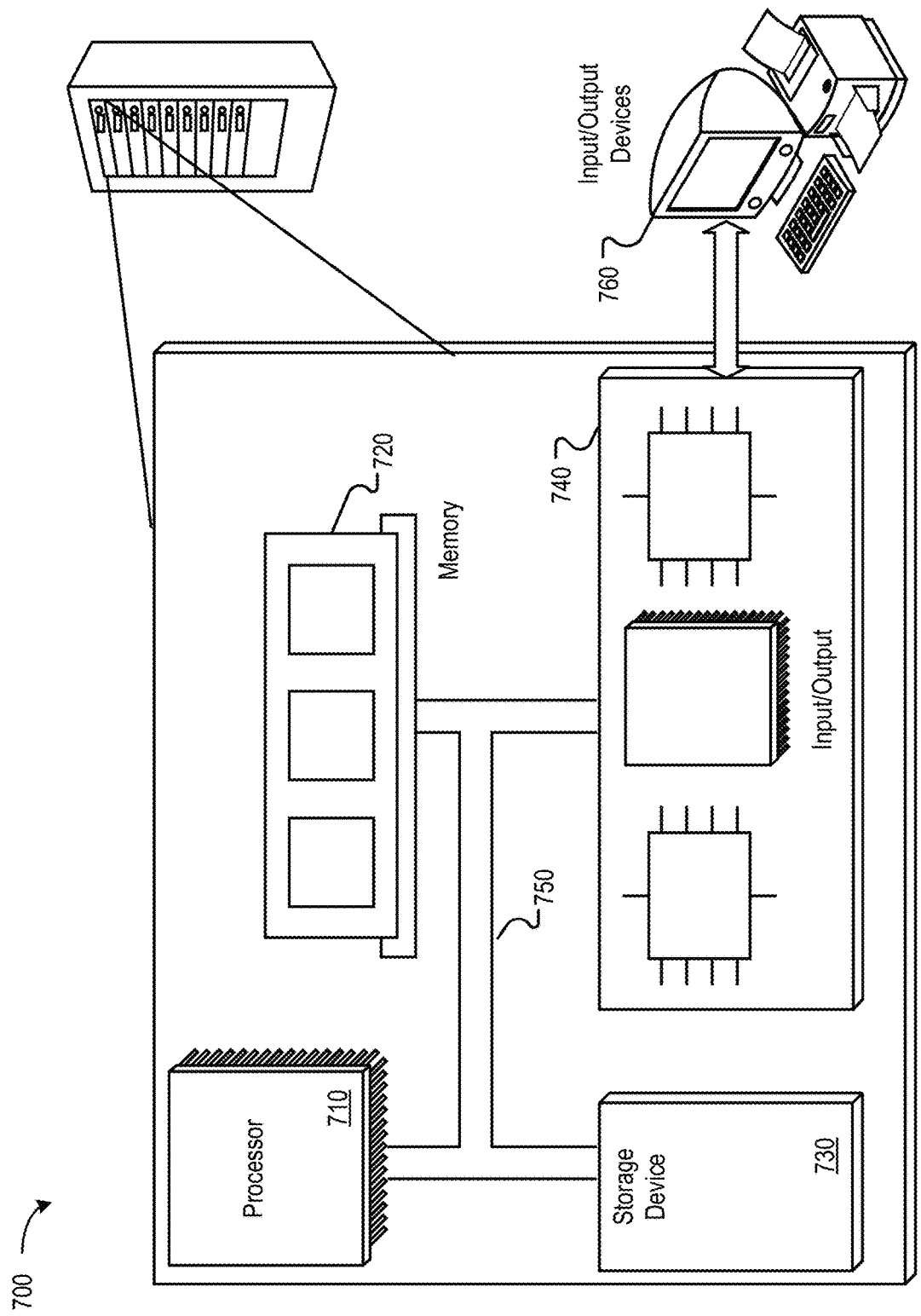
FIG. 7 illustrates an example computer system.

FIG. 7 is a block diagram of an example computer system 700. For example, referring to FIG. 2, the system 200 or a component thereof, such as the data processing systems 202, 204, the user device 210, or the servers 212, could be an example of the system 700 described here. The system 700 includes a processor 710, a memory 720, a storage device 730, and one or more input/output interface devices 740. Each of the components 710, 720, 730, and 740 can be interconnected, for example, using a system bus 750.

The processor 710 is capable of processing instructions for execution within the system 700. The term "execution" as used here refers to a technique in which program code causes a processor to carry out one or more processor instructions. In some implementations, the processor 710 is a single-threaded processor. In some implementations, the processor 710 is a multi-threaded processor. The processor 710 is capable of processing instructions stored in the memory 720 or on the storage device 730. The processor 710 may execute operations such as those described with reference to FIG. 6.

The memory 720 stores information within the system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 can include, for example, a hard disk device, an optical disk device, a solid-state drive, a flash drive, magnetic tape, or some other large capacity storage device. In some implementations, the storage device 730 may be a cloud storage device, e.g., a logical storage device including one or more physical storage devices distributed on a network and accessed using a network. In some examples, the storage device may store long-term data.

The input/output interface devices 740 provide input/output operations for the system 700. In some implementations, the input/output interface devices 740 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 700 to communicate, for example, transmit and receive data. In some implementations, the input/output device can include driver devices configured to receive input data and send output data to other input/output devices, e.g., keyboard, printer and display devices 760. In some implementations, mobile computing devices, mobile communication devices, and other devices can be used.

In some examples, the system 700 is contained within a single integrated circuit package. A system 700 of this kind, in which both a processor 710 and one or more other components are contained within a single integrated circuit package and/or fabricated as a single integrated circuit, is sometimes called a controller or microcontroller. In some implementations, the integrated circuit package includes pins that correspond to input/output ports, e.g., that can be used to communicate signals to and from one or more of the input/output interface devices 740.

Although an example processing system has been described in FIG. 7, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "controller," "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

What is claimed is:

1. A computer-implemented method comprising:
by one or more computers:
for each of a plurality of zoom levels of a map a) with a plurality of markers that each indicate a point of interest and b) for presentation on a display of any of one or more user devices, the presentation of at least one cell of a plurality of cells that each include data for some of a location on the map:
  determining a maximum size for the plurality of markers using the corresponding zoom level;
  determining, for a cell from the plurality of cells that represent the location on the map at the corresponding zoom level, a size for the cell using the maximum size for the plurality of markers;
  generating, for the corresponding zoom level, the plurality of cells for the location using the determined size for the cell;
  determining, for each of one or more of the plurality of cells, a display position for a marker in the respective cell using a result of whether the zoom level satisfies a zoom level threshold; and
  associating, in stored data in a database and for each of the one or more of the plurality of cells, at least one point of interest with the respective cell of the plurality of cells using the display position for the respective cell;
receiving, from a user device and after associating the at least one point of interest with the respective cell, a request to display points of interest for the location on a requested map at a requested zoom level; and
in response to the request,
accessing, using the requested zoom level, the stored data specifying the plurality of cells for the location on the map, the one or more of the plurality of cells having been associated with the at least one point of interest using the display position determined using a result of whether the requested zoom level satisfies the zoom level threshold;
for each of the one or more cells, selecting a point of interest from the at least one point of interest associated with the cell; and
causing the user device to display the location on the map that depicts, for each of the one or more cells, the marker for the corresponding selected point of interest at the display position in the corresponding cell.

2. The method of claim 1, comprising:
for each of the one or more cells,
  in response to determining that a first point of interest satisfies a first point of interest threshold, associating, in the database, the marker to the first point of interest as a primary marker for the corresponding cell; and associating, in the database and for each point from at least one other point of interest associated with the corresponding cell that does not satisfy the first point of interest threshold but satisfies a second point of interest threshold, a secondary marker that has a smaller size than a size for the primary marker to the corresponding point, wherein causing the user device to display the map comprises causing the user device to display the map that depicts, for each of the one or more cells, the primary marker and the at least one secondary marker each of which has a smaller size than the size for the primary marker.

3. The method of claim 2, comprising causing the user device to display the at least one secondary marker in response to the requested zoom level of the map satisfying a threshold value.

4. The method of claim 1, wherein determining the display position comprises determining whether to display the marker at the geometric median of the respective cell using the result of whether the zoom level satisfies the zoom level threshold.

5. The method of claim 1, wherein the request includes one or more search criteria, and wherein selecting the point of interest associated with each of the one or more cells comprises applying the search criteria.

6. The method of claim 1, wherein the selected point of interest comprises a lodging, a restaurant, or a rental agency.

7. The method of claim 1, comprising:
causing the user device to display the marker with static information associated with the selected point of interest;
receiving live information associated with the selected point of interest; and
causing the user device to display the marker with the live information.

8. The method of claim 1, wherein the size for the one or more of the plurality of cells is determined so that the marker fits entirely within the cell.

9. The method of claim 1, comprising determining, using the zoom level, whether a likelihood of overlap among markers in adjacent cells satisfies an overlap threshold, wherein determining the display position uses the result of the determination whether the likelihood of overlap among markers in the adjacent cells satisfies the overlap threshold.

10. A system comprising:
at least one processor; and
at least one computer-readable storage device storing instructions executable by the at least one processor to perform operations comprising:
for each of a plurality of zoom levels of a map a) with a plurality of markers that each indicate a point of interest and b) for presentation on a display of any of one or more user devices, the presentation of at least one cell of a plurality of cells that each include data for some of a location on the map:
determining a maximum size for the plurality of markers using the corresponding zoom level;
determining, for a cell from the plurality of cells that represent the location on the map at the corresponding zoom level, a size for the cell using the maximum size for the plurality of markers;
generating, for the corresponding zoom level, the plurality of cells for the location using the determined size for the cell;

determining, for each of one or more of the plurality of cells, a display position for a marker in the respective cell using a result of whether the zoom level satisfies a zoom level threshold; and associating, in stored data in a database and for each of the one or more of the plurality of cells, at least one point of interest with the respective cell of the plurality of cells using the display position for the respective cell;

receiving, from a user device and after associating the at least one point of interest with the respective cell, a request to display points of interest for the location on a requested map at a requested zoom level; and in response to the request,
accessing, using the requested zoom level, the stored data specifying the plurality of cells for the location on the map, the one or more of the plurality of cells having been associated with the at least one point of interest using the display position determined using a result of whether the requested zoom level satisfies the zoom level threshold;

for each of the one or more cells, selecting a point of interest from the at least one point of interest associated with the cell; and causing the user device to display the location on the map that depicts, for each of the one or more cells, the marker for the corresponding selected point of interest at the display position in the corresponding cell.

11. The system of claim 10, the operations comprising:
for each of the one or more cells,
in response to determining that a first point of interest satisfies a first point of interest threshold, associating, in the database, the marker to the first point of interest as a primary marker for the corresponding cell; and associating, in the database and for each point from at least one other point of interest associated with the corresponding cell that does not satisfy the first point of interest threshold but satisfies a second point of interest threshold, a secondary marker that has a smaller size than a size for the primary marker to the corresponding point, wherein causing the user device to display the map comprises causing the user device to display the map that depicts, for each of the one or more cells, the primary marker and the at least one secondary marker each of which has a smaller size than the size for the primary marker.

12. The system of claim 11, the operations comprising causing the user device to display the at least one secondary marker in response to the requested zoom level of the map satisfying a threshold value.

13. The system of claim 10, wherein the size for the one or more of the plurality of cells is determined so that the marker fits entirely within the cell.

14. The system of claim 10, wherein determining the display position comprises determining whether to display the marker at the geometric median of the respective cell using the result of whether the zoom level satisfies the zoom level threshold.

15. The system of claim 10, the operations comprising determining, using the zoom level, whether a likelihood of overlap among markers in adjacent cells satisfies an overlap threshold, wherein determining the display position uses the result of the determination whether the likelihood of overlap among markers in the adjacent cells satisfies the overlap threshold.

16. At least one non-transitory computer-readable storage medium storing instructions executable by at least one processor to perform operations comprising:

for each of a plurality of zoom levels of a map a) with a plurality of markers that each indicate a point of interest and b) for presentation on a display of any of one or more user devices, the presentation of at least one cell of a plurality of cells that each include data for some of a location on the map:

determining a maximum size for the plurality of markers using the corresponding zoom level;

determining, for a cell from the plurality of cells that represent the location on the map at the corresponding zoom level, a size for the cell using the maximum size for the plurality of markers;

generating, for the corresponding zoom level, the plurality of cells for the location using the determined size for the cell;

determining, for each of one or more of the plurality of cells, a display position for a marker in the respective cell using a result of whether the zoom level satisfies a zoom level threshold; and associating, in stored data in a database and for each of the one or more of the plurality of cells, at least one point of interest with the respective cell of the plurality of cells using the display position for the respective cell;

receiving, from a user device and after associating the at least one point of interest with the respective cell, a request to display points of interest for the location on a requested map at a requested zoom level; and in response to the request, accessing, using the requested zoom level, the stored data specifying the plurality of cells for the location on the map, the one or more of the plurality of cells having been associated with the at least one point of interest using the display position determined using a result of whether the requested zoom level satisfies the zoom level threshold;

for each of the one or more cells, selecting a point of interest from the at least one point of interest associated with the cell; and causing the user device to display the location on the map that depicts, for each of the one or more cells, the marker for the corresponding selected point of interest at the display position in the corresponding cell.

17. The at least one computer-readable storage medium of claim 16, the operations comprising:

for each of the one or more cells, in response to determining that a first point of interest satisfies a first point of interest threshold, associating, in the database, the marker to the first point of interest as a primary marker for the corresponding cell; and associating, in the database and for each point from at least one other point of interest associated with the corresponding cell that does not satisfy the first point of interest threshold but satisfies a second point of interest threshold, a secondary marker that has a smaller size than a size for the primary marker to the corresponding point, wherein causing the user device to display the map comprises causing the user device to display the map that depicts, for each of the one or more cells, the primary marker and the at least one secondary marker each of which has a smaller size than the size for the primary marker in each of the one or more cells for the at least one other point of interest.

18. The at least one computer-readable storage medium of claim 17, the operations comprising causing the user device to display the at least one secondary marker in response to the requested zoom level of the map satisfying a threshold value.

19. The at least one computer-readable storage medium of claim 16, wherein the size for the one or more of the plurality of cells is determined so that the marker fits entirely within the cell.

20. The at least one computer-readable storage medium of claim 16, wherein determining the display position comprises determining whether to display the marker at the geometric median of the respective cell using the result of whether the zoom level satisfies the zoom level threshold.

* * * * *